US012666093B2

(12) United States Patent
Grant

(10) Patent No.: US 12,666,093 B2
(45) Date of Patent: **\*Jun. 23, 2026**

(54) ADDRESSABLE ADVERTISING INSERTION FOR PLAYOUT DELAY

(71) Applicant: DISH TECHNOLOGIES L.L.C., Englewood, CO (US)

(72) Inventor: John Grant, Centennial, CO (US)

(73) Assignee: DISH TECHNOLOGIES L.L.C., Englewood, CO (US)

( \* ) Notice: Subject to any disclaimer, the term of this patent is extended or adjusted under 35 U.S.C. 154(b) by 17 days.

This patent is subject to a terminal disclaimer.

(21) Appl. No.: 18/981,257

(22) Filed: Dec. 13, 2024

(65) Prior Publication Data

US 2025/0113069 A1       Apr. 3, 2025

Related U.S. Application Data

(63) Continuation of application No. 18/230,095, filed on Aug. 3, 2023, now Pat. No. 12,206,915, which is a (Continued)

(51) Int. Cl.
| | |
|---|---|
| *H04N 21/234* | (2011.01) |
| *H04N 21/222* | (2011.01) |
| *H04N 21/262* | (2011.01) |
| *H04N 21/43* | (2011.01) |
| *H04N 21/433* | (2011.01) |
| *H04N 21/81* | (2011.01) |
| *H04N 21/845* | (2011.01) |
| *H04N 21/8547* | (2011.01) |

(52) U.S. Cl.
CPC ... *H04N 21/23424* (2013.01); *H04N 21/2221* (2013.01); *H04N 21/26233* (2013.01); *H04N 21/26241* (2013.01); *H04N 21/43072*

(2020.08); *H04N 21/4334* (2013.01); *H04N 21/812* (2013.01); *H04N 21/8455* (2013.01); *H04N 21/8547* (2013.01)

(58) Field of Classification Search
CPC ....... H04N 21/23424; H04N 21/43072; H04N 21/2221; H04N 21/26233; H04N 21/26241; H04N 21/4334; H04N 21/812; H04N 21/8455; H04N 21/8547
See application file for complete search history.

(56) References Cited

U.S. PATENT DOCUMENTS

2014/0282692 A1\*   9/2014   Bhat ................ H04N 21/23418
                                                                                         725/32
2014/0298381 A1\*  10/2014   Koyama .......... H04N 21/44016
                                                                                         725/32

\* cited by examiner

*Primary Examiner* — Nnenna N Ekpo
(74) *Attorney, Agent, or Firm* — Kipman T. Werking; Frontier IP Law PLLC

(57)         ABSTRACT

A computer implemented method for inserting advertisement content into a program content stream includes receiving, by a headend content server, the program content stream. The program content stream includes an advertisement insertion cue. The method further includes detecting the advertisement insertion cue in the program content stream, and the advertisement insertion cue indicates an insertion point in the program content stream for inserting an advertisement. The method further includes modifying the advertisement insertion cue to indicate an expiration date and time for playout of a first advertisement content to be inserted into the program content stream, and inserting the first advertisement content into the program content stream.

16 Claims, 5 Drawing Sheets

Related U.S. Application Data continuation of application No. 17/830,033, filed on Jun. 1, 2022, now Pat. No. 11,750,856, which is a continuation of application No. 17/321,110, filed on May 14, 2021, now Pat. No. 11,381,851, which is a continuation of application No. 16/700,917, filed on Dec. 2, 2019, now Pat. No. 11,044,498, which is a continuation of application No. 14/962,362, filed on Dec. 8, 2015, now Pat. No. 10,516,900.

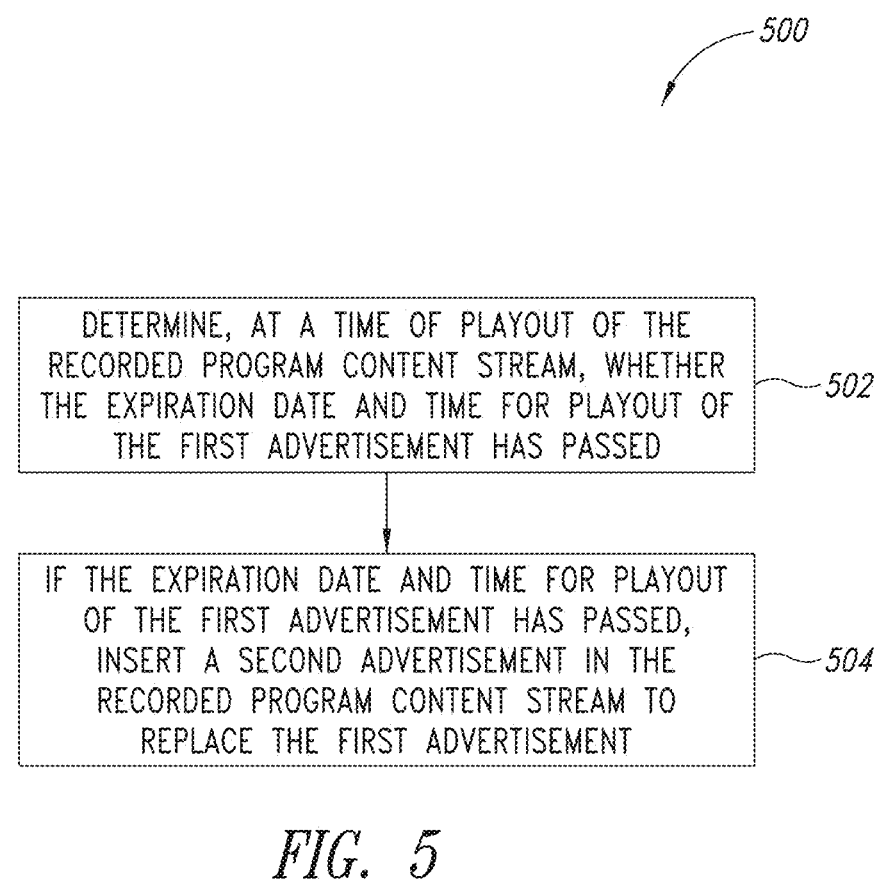

_500_

```
┌─────────────────────────────────────┐
│  DETERMINE, AT A TIME OF PLAYOUT OF THE │
│  RECORDED PROGRAM CONTENT STREAM, WHETHER │───502
│  THE EXPIRATION DATE AND TIME FOR PLAYOUT OF │
│  THE FIRST ADVERTISEMENT HAS PASSED │
└─────────────────────────────────────┘
                  │
                  ▼
┌─────────────────────────────────────┐
│  IF THE EXPIRATION DATE AND TIME FOR PLAYOUT │
│  OF THE FIRST ADVERTISEMENT HAS PASSED, │
│  INSERT A SECOND ADVERTISEMENT IN THE │───504
│  RECORDED PROGRAM CONTENT STREAM TO │
│  REPLACE THE FIRST ADVERTISEMENT │
└─────────────────────────────────────┘
```

*FIG. 5*

ADDRESSABLE ADVERTISING INSERTION FOR PLAYOUT DELAY

BACKGROUND

Technical Field

This disclosure generally relates to advertisement insertion systems and methods, and more particularly to advertisement insertion systems and methods which facilitate the insertion of replacement advertisements in recorded program content after a predetermined expiration date and time for playout has elapsed.

Description of the Related Art

Program distributors deliver audio and/or video program content to its subscribers. The program content includes, for example, television programs, multimedia services, and the like, and may further include advertisement content. The program distributors typically deliver the audio/video content to its subscribers in an industry-standard format, for example, the Moving Picture Experts Group (MPEG) MPEG-2 transport stream format.

The Society of Cable Telecommunications Engineers (SCTE) develops technology standards related to cable telecommunications engineering. The SCTE 35 standard defines the splicing of an MPEG-2 transport stream for the purpose of digital program insertion. The SCTE 35 standard also defines the messages and structure that allow the program distributor to splice, or insert, advertisements and other digital program content into the audio/video content.

Subscribers often have a receiving device, such as a set-top box, which may include a digital video recorder (DVR) or other similar content recording functionality. It is not uncommon for users to delay playout (i.e. later playback) of that content until weeks or even months have passed. Advertisements, which are placed during the live broadcast of the programming, may be somewhat time-sensitive in that their advertising value diminishes with such lapses of time before viewing; however, the advertisements which were placed in the programming during live broadcast remain in that program stream even during playout at a much later date and time.

There is thus a need for improved advertisement insertion systems and methods in this, as well as a variety of other, applications.

BRIEF SUMMARY

In one aspect, a computer implemented method for inserting advertisement content into a program content stream includes: receiving, by a headend content server, the program content stream, the program content stream having an advertisement insertion cue; detecting, by the headend content server, the advertisement insertion cue in the program content stream, the advertisement insertion cue indicating an insertion point in the program content stream for inserting an advertisement; modifying, by the headend content server, the advertisement insertion cue to indicate an expiration date and time for playout of a first advertisement content to be inserted into the program content stream; and inserting, by the headend content server, the first advertisement content into the program content stream.

The detected advertisement insertion cue may include presentation time stamp (PTS) information, and modifying, by the headend content server, the advertisement insertion cue to indicate an expiration date and time for playout of a first advertisement content to be inserted into the program content stream may include: generating a configurable value indicating an amount of time until expiration for the first advertisement; and adding the configurable value to the presentation time stamp information, thereby resulting in the expiration date and time for playout of the first advertisement content.

The method may further include: receiving, by a receiving device, the program content stream including the inserted first advertisement; recording, by the receiving device, the program content stream including the inserted first advertisement; determining, at a time of playout of the recorded program content stream including the inserted first advertisement, whether the expiration date and time for playout of the inserted first advertisement has passed; and inserting a second advertisement in the recorded program content stream to replace the first advertisement if the expiration date and time for playout of the inserted first advertisement has passed.

Determining whether the expiration date and time for playout of the inserted first advertisement has passed may be performed by the receiving device or by the headend content server. Similarly, inserting a second advertisement in the recorded program content stream to replace the first advertisement if the expiration date and time for playout of the inserted first advertisement has passed may be performed by the receiving device or by the headend content server.

The first advertisement may be a national advertisement, and the second advertisement may be a local advertisement.

In another aspect, an advertisement insertion system includes a headend content server. The headend content server is configured to receive a program content stream, the program content stream having an advertisement insertion cue. The headend content server is further configured to: detect the advertisement insertion cue in the program content stream, the advertisement insertion cue indicating an insertion point in the program content stream for inserting an advertisement; modify the advertisement insertion cue to indicate an expiration date and time for playout of a first advertisement content to be inserted into the program content stream; and insert the first advertisement content into the program content stream.

The headend content server may be further configured to: generate a configurable value indicating an amount of time until expiration for the first advertisement; and add the configurable value to the presentation time stamp (PTS) information, thereby resulting in the expiration date and time for playout of the first advertisement content.

The advertisement insertion system may further include a receiving device. The receiving device may be configured to: receive the program content stream including the inserted first advertisement; and record the program content stream including the inserted first advertisement.

The receiving device and/or the headend content server may be even further configured to: determine, at a time of playout of the recorded program content stream including the inserted first advertisement, whether the expiration date and time for playout of the inserted first advertisement has passed; and insert a second advertisement in the recorded program content stream to replace the first advertisement if the expiration date and time for playout of the inserted first advertisement has passed.

In another aspect, a non-transitory computer readable medium includes computer executable instructions thereon that, when executed by a computer processor, cause the computer processor to: detect an advertisement insertion cue in a received program content stream, the advertisement insertion cue indicating an insertion point in the program content stream for inserting an advertisement; modify the advertisement insertion cue to indicate an expiration date and time for playout of a first advertisement content to be inserted into the program content stream; and insert the first advertisement content into the program content stream.

In another aspect, a method of inserting advertisement content during playout by a receiving device of a recorded program content stream, the recorded program content stream having an advertisement insertion cue indicating an expiration date and time for playout of a first advertisement content inserted in the program content stream, includes: determining, by the receiving device, at a time of playout of the recorded program content stream, whether the expiration date and time for playout of the first advertisement has passed; and inserting, by the receiving device, a second advertisement in the recorded program content stream to replace the first advertisement if the expiration date and time for playout of the inserted first advertisement has passed.

BRIEF DESCRIPTION OF THE SEVERAL VIEWS OF THE DRAWINGS

FIG. 5 is a flowchart illustrating a method for inserting a second advertisement content during playout by a receiving device of a recorded program content stream having an advertisement insertion cue indicating an expiration date and time for playout of a first advertisement content has passed.

Figure 1:
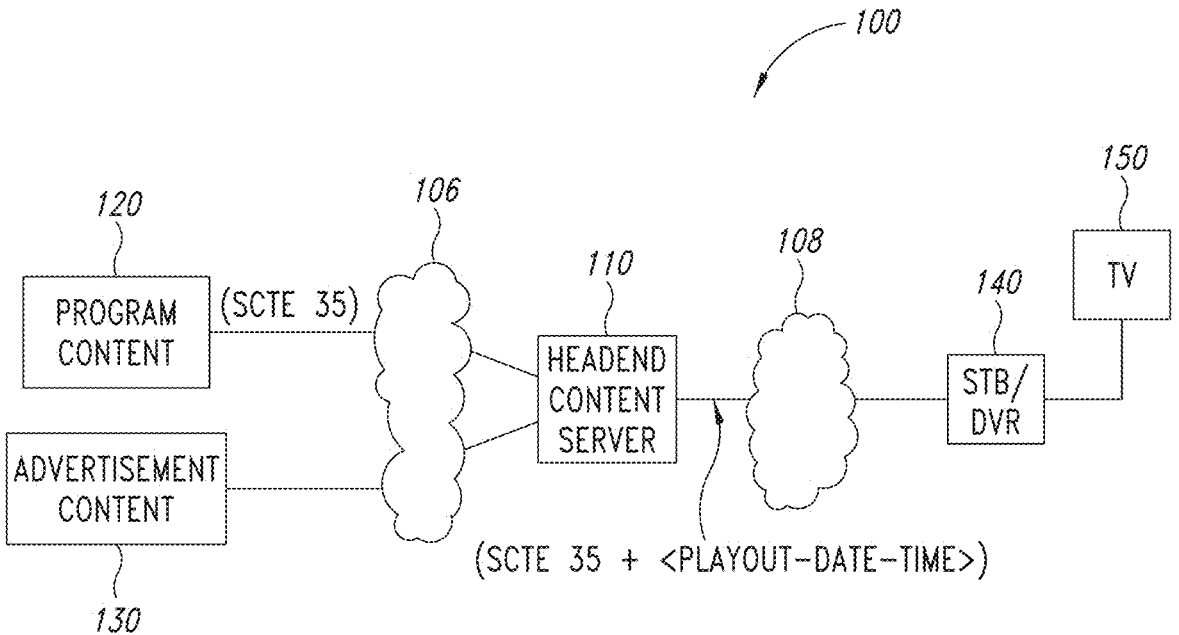
FIG. 1 is a block diagram illustrating an advertisement insertion system, according to one embodiment.

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility. Further, the particular shapes of the elements as drawn are not intended to convey any information regarding the actual shape of the particular elements and have been selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Well-known structures and methods associated with media content delivery have not been shown or described in detail to avoid unnecessarily obscuring descriptions of the preferred embodiments.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1 is a block diagram illustrating an advertisement insertion system 100 according to one embodiment. It is to be appreciated that FIG. 1 illustrates one example of an advertisement insertion system 100 and that the various embodiments discussed herein are not limited to the exemplary network of FIG. 1. The system 100 may include a variety of communication systems and may use a variety of communication media including, but not limited to, satellite wireless media, cable media or any media over which communication of broadcast television programming, on-demand programming, and/or streaming media may occur, and/or over which Internet communication may occur.

The system 100 includes a headend content server 110, which receives program content 120 and advertisement content 130. Program content 120 may be provided from one or more content providers (not shown), which provide content such as video content and/or audio content (hereinafter "program content") to a distributor, such as a distributor operating the headend content server 110. The program content 120 may include content provided from content providers such as television stations which provide local or national video programming, special content providers which provide premium based programming or pay-per-view programming, and/or radio stations which provide audio programming. In addition, or in the alternative, the program content 120 may include content provided from on-demand content services, streaming media services, or the like which provide audio, video and other types of program content to the headend content server 110 for delivery of programming to a subscriber.

Advertisement content 130 may be provided to, or accessible by, the headend content server 110 from one or more advertisement sources, which may be or include one or more databases storing advertisement content 130. Advertisement content 130 may be provided to the headend content server 110 directly from advertisers, or from third party advertisement aggregators, services or the like.

The headend content server 110 receives the program content 120 and advertisement content 130 over a communication network 106, and the headend content server 110 is coupled to a receiving device 140 over a communication network 108. The receiving device 140 receives the program content 120 and advertisement content 130 and connects to a presentation device 150 to display the program content 120 and advertisement content 130 received from the headend content server 110.

The communication networks 106, 108 may be or include many different types of communication media, now known or later developed. Non-limiting media examples include telephony systems, the Internet, internets, cable networks, fiber optic networks, microwave networks, asynchronous transfer mode (ATM) systems, frame relay networks, packet switched networks, digital subscriber loop (DSL) systems, radio frequency (RF) networks and satellite systems. Further, program content 120 and/or advertisement content 130 may be communicated from program and advertisement content providers to the headend content server 110 over various combinations of media. For example, a television broadcast station may initially communicate program content, via an RF signal or other suitable medium, which is received and then converted into a digital signal suitable for transmission to the headend content server 110 over a fiber optics network. As another non-limiting example, an audio content provider may communicate audio content via its own satellite system to the headend content server 110.

The received program content 120 and/or advertisement content 130 is converted by one or more devices (not shown) as necessary at the headend content server 110 into a suitable signal that is communicated (i.e. "uplinked") by one or more antennae to one or more satellites (not separately illustrated herein, although considered part of the communication network 108). It is to be appreciated that the communicated uplink signal may contain a plurality of multiplexed programs. The uplink signal is received by the satellite and then communicated (i.e., "downlinked") from the satellite in one or more directions, for example, onto a predefined portion of the planet. It is appreciated that the format of the above-described signals are adapted as necessary during the various stages of communication.

An antenna that is within reception range of the downlink signal communicated from satellite receives the above-described downlink signal. The antenna can be located at a customer premises. Examples of customer premises include a residence, a business, a car, or any other suitable location operable to receive signals from satellite or other communication systems. The received signal is communicated, typically over a hard-wire connection, to the receiving device 140, which converts the received signal into a signal suitable for communication to a presentation device 150.

The receiving device 140 may receive content partially from, or entirely from, another source other than the above-described antenna. Other embodiments of the receiving device 140 may receive locally broadcast RF signals, and/or may be coupled to communication network 108 via any suitable medium. Non-limiting examples of media communicatively coupling the receiving device 140 to communication network 108 include cable, fiber optic, radio frequency, streaming or Internet media.

The receiving device 140, as well as any other devices shown in FIG. 1 and/or other devices or systems described herein, may include at least one computer processor coupled to at least one non-transitory memory, and is configured to execute computer-executable instructions to carry out, enable and/or otherwise perform applicable actions described herein of the system 100 and the different embodiments described herein. Examples of a receiving device include, but are not limited to, a television converter, receiver, set-top box, television receiving device, television receiver, television recording device, satellite set-top box, satellite receiver, cable set-top box, cable receiver, personal computer, media player, mobile device, tablet computing device, smart phone and/or television tuner. Accordingly, the receiving device 140 may be any suitable converter device or electronic equipment that is operable to receive programming (i.e. program content 120 and advertisement content 130). Further, the receiving device 140 may itself include user interface devices, such as buttons, switches, a display, and may include the presentation device 150. Additionally, the receiving device 140 includes recording capability, and may be or include a digital video recorder (DVR).

Examples of a presentation device 150 include, but are not limited to, a television (TV), a personal computer (PC), a media player, mobile device, tablet computing device, smart phone or the like. Presentation devices 120 employ a display, one or more speakers and/or other output devices to communicate program content 120 and/or advertisement content 130 to a user. In many implementations, one or more presentation devices 150 reside in or near a customer's premises and are communicatively coupled, directly or indirectly, to the receiving device 140.

Figure 2A:
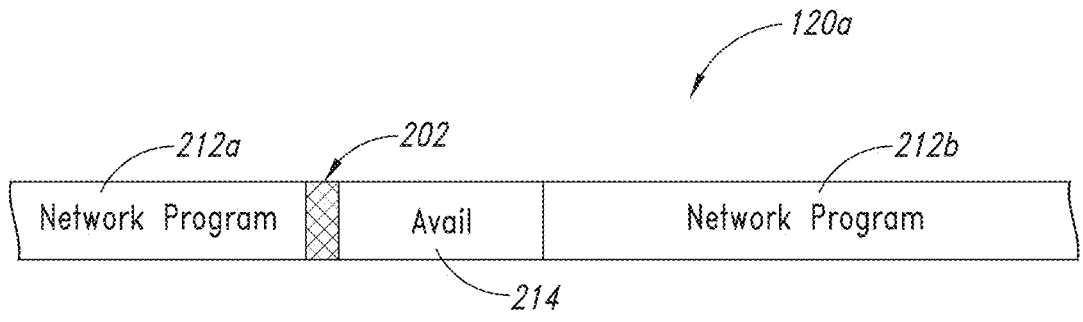
FIG. 2a is a signal diagram illustrating a program content stream including an advertisement insertion cue and an avail, according to one embodiment.

The program content 120 received by the headend content server 110 may include conventional advertisement insertion cues. For example, the program content 120 (which may be, for example, received external television signals) may be a MPEG-2 transport stream having embedded advertisement insertion cues in accordance with the SCTE 35 standard. SCTE 35 is a broadcast standard that pertains to digital program insertion (DPI) in broadcasts, and describes the in-stream insertion of cue tones in MPEG streams to signal splicing and insertion (e.g. advertisement insertion or insertion of other content types) opportunities. Further, and as shown in FIG. 2a, the program content 120 may include an advertisement insertion cue 202 (such as a modified SCTE 35 signal) that includes a presentation time stamp (PTS) field for addressable insertion, such that the advertisement insertion cue 202 indicates to the headend content server 110 and/or the receiving device 140 when to insert the addressable content (e.g., a local advertisement) into the programming stream for playout. The program content 120 may include a broadcasting stream having an avail, meaning an advertisement time slot, 214 disposed between network program portions 212a, 212b. The advertisement insertion cue 202 indicates a timing, such as a specific frame or PTS in the received program content 120 stream, for inserting an advertisement into the avail portion 214 of the program content 120 stream.

During a live broadcast, the headend content server 110 analyzes the received program content 120 for advertisement insertion cues 202, modifies the advertisement insertion cues 202 and simultaneously provides the program content 120 to the receiving device 140, for example, over the communication network 108.

Figure 2B:
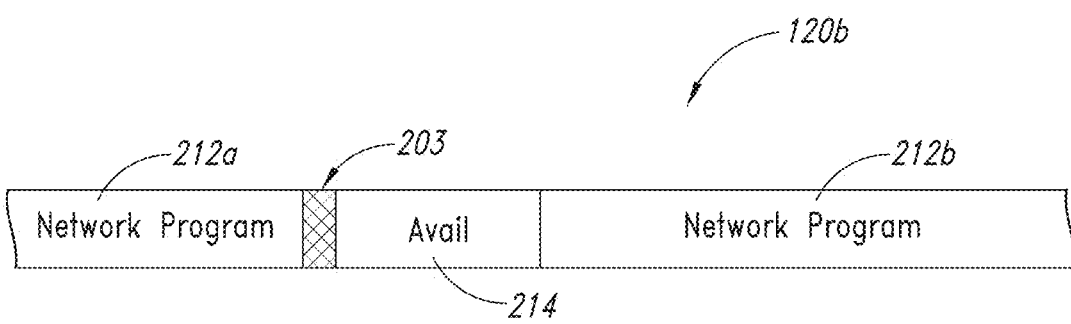
FIG. 2b is a signal diagram illustrating a program content stream including a modified advertisement insertion cue indicating an expiration date and time for playout of an advertisement inserted into the avail, according to one embodiment.

Referring to FIGS. 2a and 2b, when the headend content server 110 detects an advertisement insertion cue 202, the headend content server 110 generates a modified advertisement insertion cue 203 that includes a field indicating an expiration date and time (shown as the value <playout-date-time>) for playout of an advertisement inserted into the avail 214. The advertisement insertion cue 202 may include a presentation time stamp (PTS) in Coordinated Universal Time (UTC), and the modified advertisement insertion cue 203 may include a configurable value, which when added to the PTS, results in an expiration date and time for playout of an inserted advertisement. That is, the modified advertisement insertion cue 203 may include a <playout-date-time> field in accordance with the following expression: <Configurable value>+Existing Date/Time (PTS)=<playout-date-time>.

Thus, during a live broadcast, the headend content server 110 receives the program content stream 120*a*, generates a modified advertisement insertion cue 203 and provides the program content stream 120*b*, including the modified advertisement insertion cue 203, to the receiving device 140. Either of the headend content server 110 or the receiving device 140, upon recognition of the advertisement insertion cue 203, may insert an appropriate advertisement, selected from the advertisement content 130, into the avail 214 slot of the program content stream 120*b*.

Figure 3A:
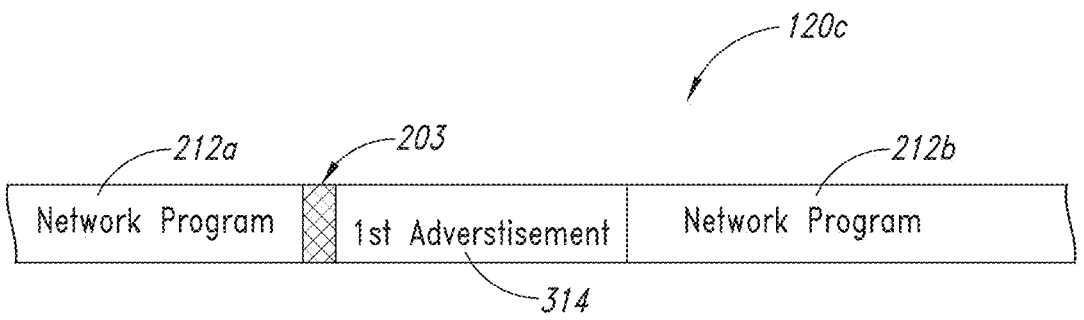
FIG. 3a is a signal diagram illustrating a program content stream including a modified advertisement insertion cue and a first advertisement inserted into the avail, according to one embodiment.

As discussed above, the receiving device 140 may include recording capability, and may be or include a digital video recorder (DVR). As such, a user may record a broadcast program stream and store the program for later playout on the presentation device 150. FIG. 3*a* illustrates a program content stream 120*c* received by the receiving device 140 during original broadcasting of the content, and stored by the receiving device 140 for later playout. An advertisement 314 has been inserted into the avail slot 214 in the program content stream 120*c* of FIG. 3*a*. Insertion of the advertisement 314 may be performed upon detection of the advertisement insertion cue 203 by the headend content server 110 or by the receiving device 140.

Depending on the time of playout of the recorded program content 120*c* having the modified advertisement insertion cue 203, the advertisement 314 inserted into the avail 214 may be the advertisement originally placed in the avail 214 during live broadcast of the program content 120, or may be a replacement advertisement. That is, the receiving device 140 reads the modified advertisement insertion cue 203 to determine the expiration date and time for playout, and compares the expiration date and time for playout with the actual time of playout in order to determine whether the advertisement has been expired and thus may be replaced. If the expiration date and time for playout (i.e. <playout-date-time>) associated with the originally-inserted advertisement 314 has not yet passed at the time of playout of the recorded program content 120*c*, the originally-inserted advertisement 314 will remain in the program content stream 120*c* during playout.

Figure 3B:
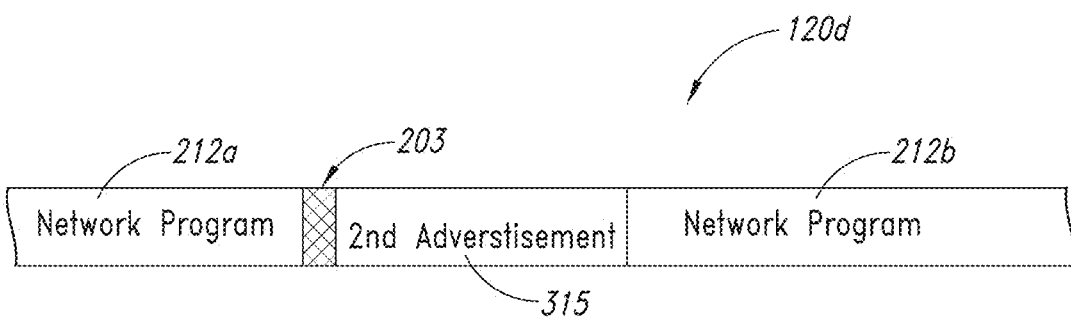
FIG. 3b is a signal diagram illustrating a program content stream including a modified advertisement insertion cue and a second advertisement inserted into the avail, according to one embodiment.

If, on the other hand, the expiration date and time for playout associated with the originally-inserted advertisement 314 has passed at the time of playout of the recorded program content 120*c*, the receiving device 140 or the headend content server 110, upon determining from the modified advertisement insertion cue 203 that the recorded advertisement 314 has expired, may insert a replacement advertisement 315 into the avail slot 214. This is shown in FIG. 3*b*, which illustrates a program content stream 120*d*, including a replacement advertisement 315, which replaces the recorded, originally-inserted advertisement 314.

The advertisement insertion system 100, as shown in FIG. 1 and described above, performs the advertisement insertion at the headend content server 110 or at the receiving device 140. One skilled in the art will readily understand that it is also feasible to perform advertisement insertion at the headend content server 110 for broadcast advertisement content, and at the receiving device 140 for delayed playout advertisement content. The originally-inserted broadcast advertisement 314 may be replaced, for example, with a targeted or local advertisement 315.

The following is an example in which the embodiments described herein can be used. Assume that a sporting event that has a national following is broadcast, such as a football game, a baseball game, or, in some instances, a national level game such as the Super Bowl or the World Series. When the broadcast is transmitted live, a large nationwide company having retail outlets in every state may pay a significant amount of money to have the advertisement show up in all markets nationwide. For example, this may be an advertisement for a particular brand of car that is sold nationwide, with the advertising focusing on the car brand itself. At the time that the broadcast is first displayed live, a modified advertisement insertion cue 203 is placed into the recording stream indicating that after a period of time, such as one week, the advertising for the nationwide product will expire and the advertisement may be replaced by a different advertisement. Accordingly, two weeks later when the user plays back the sporting event to watch the sporting event later on, the date for the original advertisement will have expired, as indicated by the insertion cue. Accordingly, a different advertisement will therefore be placed into the available time slot and the original advertisement will be removed. In this instance, it may be an advertisement for a local automobile dealership, a local tire store, or some other business which has only a location-specific application, rather than a nationwide application.

The source of the second advertisement 315 can vary depending on the type of advertisement. In one embodiment, the source of second advertisement 315 can be advertisements which have been previously downloaded and stored in the set-top box 140. The content distributor knows the address and physical location of each set-top box 140. For example, Comcast®, DISH Network®, DIRECTV®, and the other content distributors, know the location of each set-top box based on having the address of their subscribers. Thus, they can easily, using zip codes or other identifying information, determine those set-top boxes that are in a selected market, such as the Seattle market, the Denver market, the New York market, and the like. Further, using zip codes or other geographic market identifiers, they can identify particular segments within the market, including such small towns as Yelm, Bothell, and the like, to more specifically identify advertisements which may be specific to that particular set-top box. During a set-top box reconfiguration, which is usually performed when the TV is off (e.g., at 3:00 am), the content provider can download to the set-top box a series of advertisements which will be stored in the DVR of the set-top box, and indicated as available for insertion into the replay streams based on the time slot being available as indicated by the modified advertisement insertion cue 203. Namely, the set-top box has stored therein numerous advertisements which have been preprogrammed into and stored in the set-top box and are available for use as a second advertisement. Accordingly, when the modified advertisement insertion cue 203 indicates that the first advertisement has expired, then the system will retrieve a backup advertisement, such as the second advertisement 315, and will insert it into that particular location in the playback stream during the playback of the recorded signal.

Since the program content provider normally provide updates to the set-top box at least once a week, and sometimes more frequently, a sequence of backup advertisements can be provided and stored into the set-top box once a week, or more frequently, as desired. This downloading can be done either via the standard connection through which the program content is provided, over an Internet connection that the set-top box is connected to, or some other technique, since many communication channels to the set-top box are known.

An alternative source of the second advertisement 315 can be a live stream from the program content provider or an advertisement provider. Namely, when a modified advertisement insertion cue 203 indicates that the first advertisement has expired, the system can send a signal to the provider of the advertisement content 130, and indicate that there is an available slot for a new advertisement. In response to this query, the advertisement content 130 can transmit, live and for immediate insertion, through network 106, through the headend content server 110, a new advertisement to be inserted into the playback stream as advertisement 315, as indicated in FIG. 3B. Thus, a second source for the second advertisement 315 can be a live download which occurs immediately upon the modified advertisement insertion cue 203 indicating that the time has expired and that the advertisement slot 315 is available for a new advertisement. Providing the second advertisement 315 live will operate more cleanly and more quickly if there is fast and clean communication between the advertisement content 130 and the set-top box 140, which, in many instances, may be available. In those instances in which it is not available, then storing the new advertisement 315 at some other location, either within the headend content server 110 within the set-top box 140 is also available in the manner as previously described.

The ability to replace a first advertisement 314 with a second advertisement 315 provides a number of benefits. First, an increased revenue stream can be provided to those providing the program content. Namely, the distributor of the first program can receive a fee for showing the first advertisement to a nationwide audience. They can assure the advertiser that the advertisement will be displayed live to all viewers, and that it will remain in the broadcast stream for a period of time, even when the stream has been recorded at a local DVR within a local set-top box 140. Further, after a set period of time, the content provider can receive additional revenue by contracting with another company to run the second advertisement in a popular program which is likely to be viewed multiple times over the coming weeks. In addition, this provides the benefit that local advertisers can be linked with very popular and nationwide initial broadcasts. As can be expected, it may be very difficult, and practically impossible, for a small local company such as a local tire store, a particular automobile dealer, a doughnut shop, or the like, to place an advertisement in a program such as the Super Bowl. On the other hand, these companies will be able to pay a small fee in order to be a second advertiser only within their local community that has direct knowledge of their store, based on the zip code or other geographic market identifier of the viewer when they watch the Super Bowl a second time, from their DVR. Accordingly, the small company has the opportunity to have an advertisement inserted into a frequently re-seen or time-shifted broadcast, such as the Super Bowl.

Figure 4:
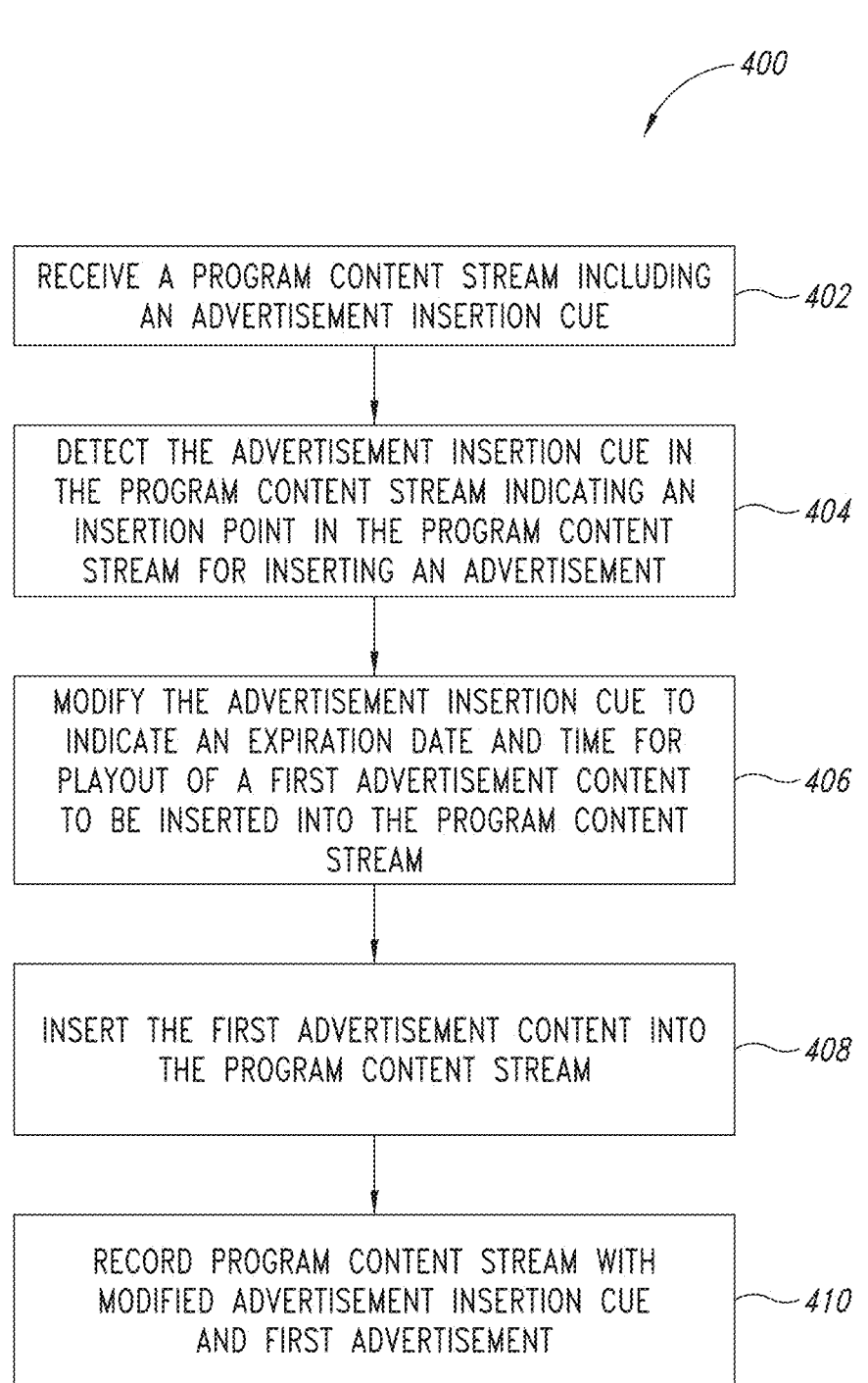
FIG. 4 is a flowchart illustrating a method for modifying the advertisement insertion cue and then inserting advertisement content into a program content stream, according to one embodiment.

FIG. 4 is a flowchart illustrating a method 400 for inserting advertisement content into a program content stream, in accordance with one embodiment. At 402, the headend content server 110 receives the program content stream 120. The program content stream 120 includes an advertisement insertion cue 202.

At 404, the headend content server 110 detects the advertisement insertion cue 202 in the program content stream 120, and the advertisement insertion cue 202 indicates an insertion point in the program content stream 120 for inserting an advertisement.

At 406, the headend content server 110 modifies the advertisement insertion cue 203 to indicate an expiration date and time for playout of a first advertisement content 314 to be inserted into the program content stream 120.

At 408, the headend content server 110 inserts the first advertisement content 314 into the program content stream 120.

The program content stream 120, including the modified advertisement insertion cue 203 and the inserted first advertisement content 314 may thus be received by the receiving device 140 and recorded in the local set-top box DVR for later playout in step 410.

FIG. 5 is a flowchart illustrating a method 500 of inserting a second advertisement content during playout by a receiving device of a recorded program content stream 120, the recorded program content stream 120 having an advertisement insertion cue 203 indicating an expiration date and time for playout of a first advertisement content 314 inserted in the program content stream 120, in accordance with one embodiment.

At 502, the receiving device 140 determines, at a time of playout of the recorded program content stream 120, whether the expiration date and time for playout of the first advertisement 314 has passed.

At 504, the receiving device 140 or the headend server 110 inserts a second advertisement 315 in the recorded program content stream 120 to replace the first advertisement 314 if the expiration date and time for playout of the inserted first advertisement 314 has passed.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method for inserting advertisement content into a program content stream, comprising:
receiving, by a headend content server, the program content stream, the program content stream having an advertisement insertion cue;

detecting, by the headend content server, the advertisement insertion cue in the program content stream, the advertisement insertion cue indicating an insertion point in the program content stream for inserting an advertisement;

modifying, by the headend content server, the advertisement insertion cue to indicate an expiration date and time for playout of a first advertisement content to be inserted into the program content stream; and inserting, by the headend content server, the first advertisement content into the program content stream;

wherein:

upon expiration of the first advertisement content, the first advertisement content is replaced with a second advertisement content that is more locally targeted to a location of a user than the first advertisement content.

2. The method of claim 1, wherein the detected advertisement insertion cue includes presentation time stamp information, and wherein modifying, by the headend content server, the advertisement insertion cue to indicate an expiration date and time for playout of a first advertisement content to be inserted into the program content stream comprises:

generating a configurable value indicating an amount of time until expiration for the first advertisement; and adding the configurable value to the presentation time stamp information, thereby resulting in the expiration date and time for playout of the first advertisement content.

3. The method of claim 1, further comprising:

receiving, by a receiving device, the program content stream including the inserted first advertisement;

recording, by the receiving device, the program content stream including the inserted first advertisement;

determining, at a time of playout of the recorded program content stream including the inserted first advertisement, whether the expiration date and time for playout of the inserted first advertisement has passed; and inserting a second advertisement in the recorded program content stream to replace the first advertisement if the expiration date and time for playout of the inserted first advertisement has passed.

4. The method of claim 3, wherein determining whether the expiration date and time for playout of the inserted first advertisement has passed comprises:

determining, by the receiving device, at a time of playout of the recorded program content stream including the inserted first advertisement, whether the expiration date and time for playout of the inserted first advertisement has passed.

5. The method of claim 3, wherein determining whether the expiration date and time for playout of the inserted first advertisement has passed comprises:

determining, by the headend content server, at a time of playout of the recorded program content stream including the inserted first advertisement, whether the expiration date and time for playout of the inserted first advertisement has passed.

6. The method of claim 3, wherein inserting a second advertisement in the recorded program content stream to replace the first advertisement if the expiration date and time for playout of the inserted first advertisement has passed, comprises:

inserting, by the receiving device, a second advertisement in the recorded program content stream to replace the first advertisement if the expiration date and time for playout of the inserted first advertisement has passed.

7. The method of claim 3, wherein inserting a second advertisement in the recorded program content stream to replace the first advertisement if the expiration date and time for playout of the inserted first advertisement has passed, comprises:

inserting, by the headend content server, a second advertisement in the recorded program content stream to replace the first advertisement if the expiration date and time for playout of the inserted first advertisement has passed.

8. The method of claim 3, wherein the first advertisement comprises a national advertisement, and the second advertisement comprises a local advertisement.

9. An advertisement insertion system, comprising:

a headend content server configured to:

receive a program content stream, the program content stream having an advertisement insertion cue;

detect the advertisement insertion cue in the program content stream, the advertisement insertion cue indicating an insertion point in the program content stream for inserting an advertisement;

modify the advertisement insertion cue to indicate an expiration date and time for playout of a first advertisement content to be inserted into the program content stream; and insert the first advertisement content into the program content stream;

wherein the system is configured such that:

upon expiration of the first advertisement content, the first advertisement content is replaced with a second advertisement content that is more locally targeted to a location of a user than the first advertisement content.

10. The advertisement insertion system of claim 9, wherein the headend content server is further configured to:

generate a configurable value indicating an amount of time until expiration for the first advertisement; and add the configurable value to presentation time stamp information, thereby resulting in the expiration date and time for playout of the first advertisement content.

11. The advertisement insertion system of claim 9, further comprising:

a receiving device configured to:

receive the program content stream including the inserted first advertisement; and record the program content stream including the inserted first advertisement.

12. The advertisement insertion system of claim 11, wherein the receiving device is further configured to:

determine, at a time of playout of the recorded program content stream including the inserted first advertisement, whether the expiration date and time for playout of the inserted first advertisement has passed; and insert a second advertisement in the recorded program content stream to replace the first advertisement if the expiration date and time for playout of the inserted first advertisement has passed.

13. The advertisement insertion system of claim 11, wherein the headend content server is further configured to:

determine, at a time of playout of the recorded program content stream including the inserted first advertisement, whether the expiration date and time for playout of the inserted first advertisement has passed; and insert a second advertisement in the recorded program content stream to replace the first advertisement if the expiration date and time for playout of the inserted first advertisement has passed.

14. The advertisement insertion system of claim 12, wherein the first advertisement comprises a national advertisement, and the second advertisement comprises a local advertisement.

15. The advertisement insertion system of claim 13, wherein the first advertisement comprises a national advertisement, and the second advertisement comprises a local advertisement.

16. A method of inserting advertisement content during playout by a receiving device of a recorded program content stream, the recorded program content stream having an advertisement insertion cue indicating an expiration date and time for playout of a first advertisement content inserted in the program content stream, comprising:

determining, by the receiving device, at a time of playout of the recorded program content stream, whether the expiration date and time for playout of the first advertisement has passed; and inserting, by the receiving device, a second advertisement in the recorded program content stream to replace the first advertisement if the expiration date and time for playout of the inserted first advertisement has passed;

wherein:

upon expiration of the first advertisement content, the first advertisement content is replaced with a second advertisement content that is more locally targeted to a location of a user than the first advertisement content.

\*　\*　\*　\*　\*